Figure 1:
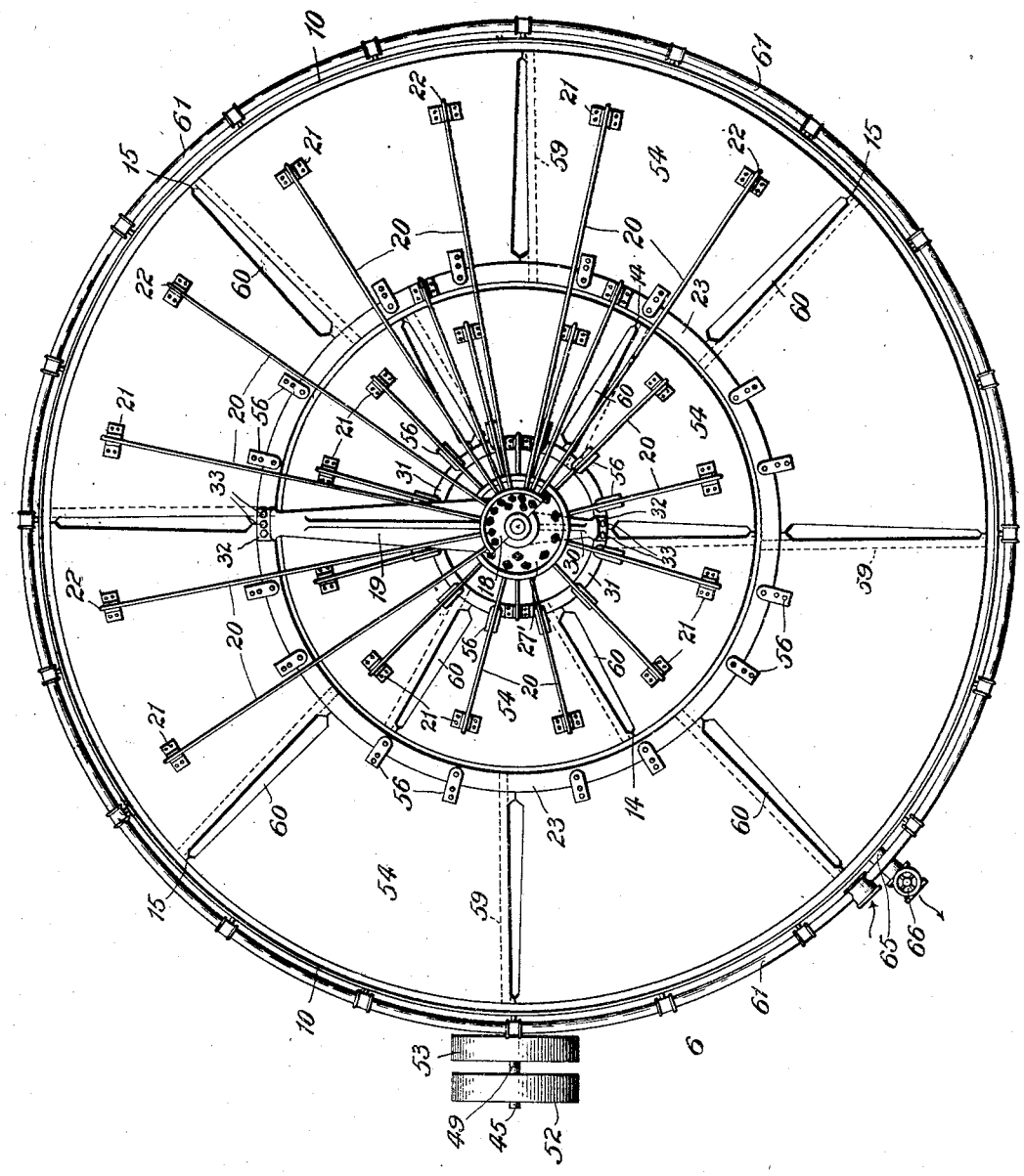

No. 796,753. PATENTED AUG. 8, 1905.
J. R. PARKS.
MACHINE FOR TREATING ORES.
APPLICATION FILED AUG. 20, 1903.

4 SHEETS—SHEET 1.

Witnesses:
Chas. L. Gaylord,
John Enders

Inventor:
John R. Parks,
By Thomas F. Sheridan,
Att'y.

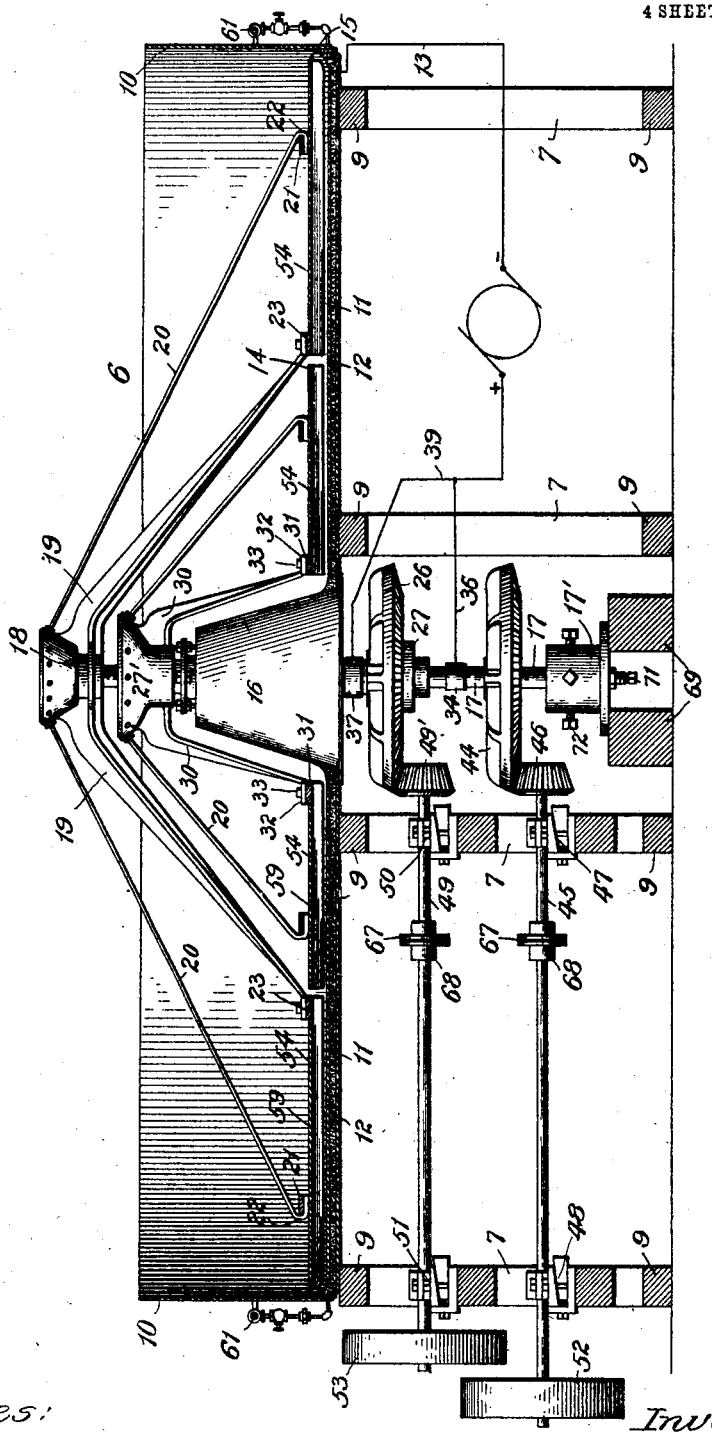

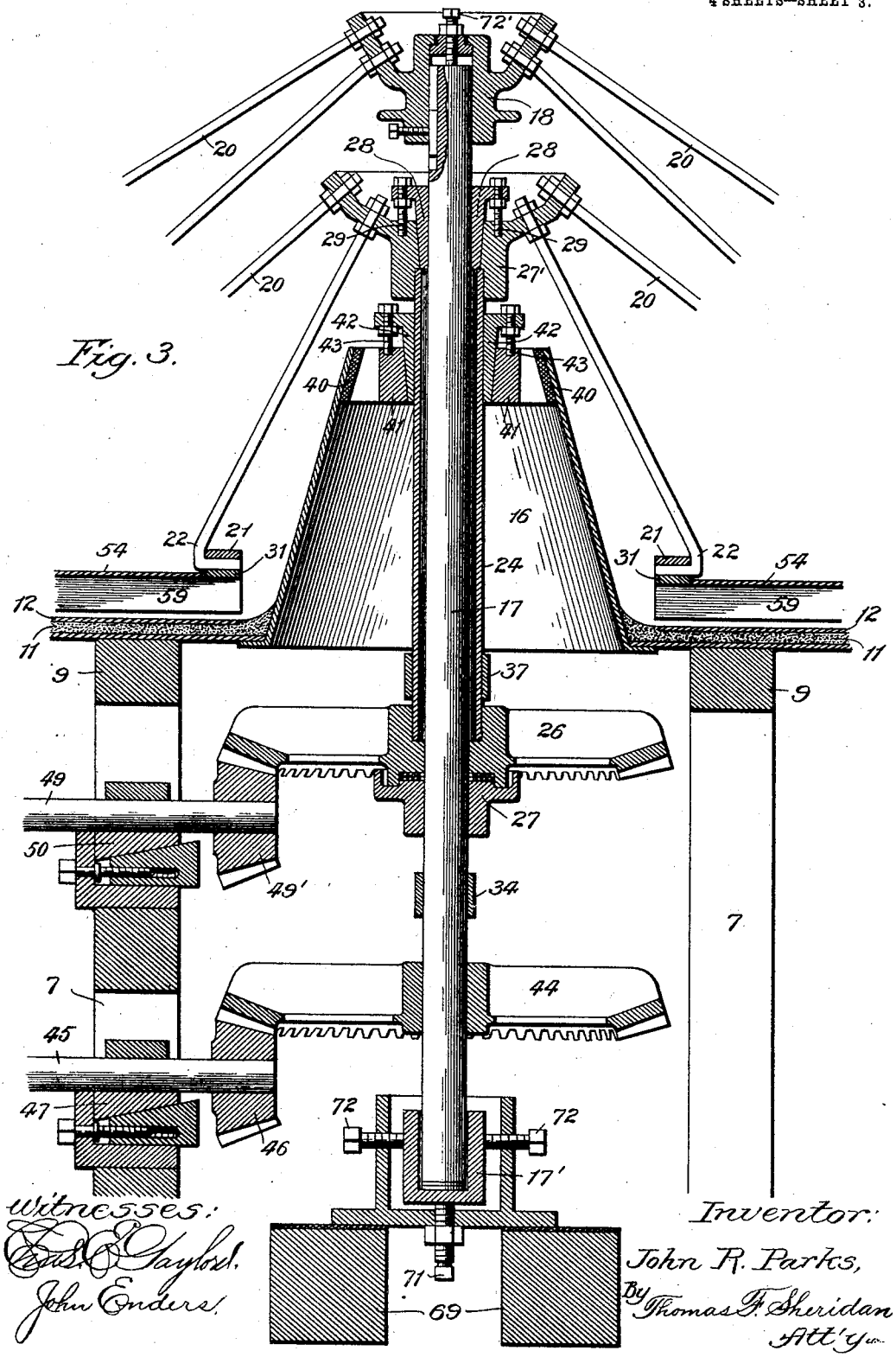

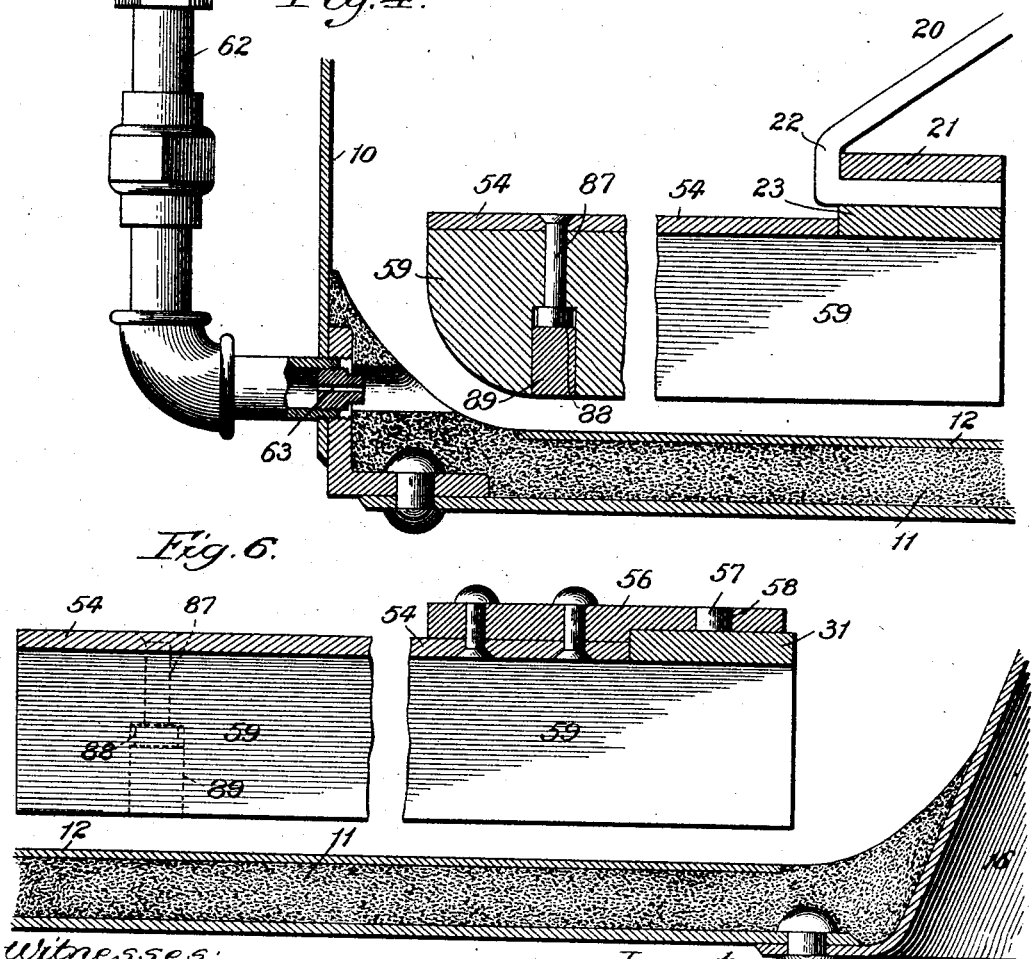

UNITED STATES PATENT OFFICE.

JOHN R. PARKS, OF SPOKANE, WASHINGTON.

MACHINE FOR TREATING ORES.

No. 796,753.　　　　　Specification of Letters Patent.　　　　　Patented Aug. 8, 1905.

Application filed August 20, 1903. Serial No. 170,190.

*To all whom it may concern:*

Be it known that I, JOHN R. PARKS, a citizen of the United States, residing at Spokane, county of Spokane, State of Washington, have invented certain new and useful Improvements in Machines for Treating Ores, of which the following is a specification.

My invention relates to that class of machines for treating ores having a shell provided with a chamber and having separate metallic elements connected to opposite poles, respectively, of a source of electric supply, such shell being provided with means for admitting air under pressure to the chamber.

It relates particularly to a machine having a shell provided with a chamber and having separate insulated metallic elements connected to opposite poles, respectively, of a source of electric supply, one of such metallic elements being amalgamated, whereby a current of electricity may be passed through the mixture containing pulverized ore to be treated, the machine being also provided with means for agitating the mixture to be treated, so as to keep the pulverized ore in suspension, and having means for simultaneously forcing air under pressure into the chamber and through the mixture while said mixture is subjected to the action of an electric current.

The principal object of the invention is to provide a simple, economical, and efficient machine for treating ores.

A further object of the invention is to provide a machine for treating ores whereby particles of mineral contained in the ores which have been crushed to a fine powder and intermixed with a liquid solution containing the desired ingredients may be agitated sufficiently to maintain them in suspension while subjected to the action of a current of electricity and simultaneously to the action of the chemicals contained in the mixture and a supply of air under pressure simultaneously forced therethrough.

Other and further objects of the invention will appear from an examination of the drawings and the following description and claims.

The invention consists in the features, combinations, and details of construction hereinafter described and claimed.

In the accompanying drawings, Figure 1 is a detail plan view of my improved machine for treating ores, showing one of the shells or pans with its disk and air-supply mechanism; Fig. 2, a sectional elevation of the machine shown in Fig. 1; Fig. 3, an enlarged sectional elevation in detail of the central portion of the mechanism shown in Figs. 1 and 2; Fig. 4, an enlarged sectional elevation in detail, showing additional portions of the mechanism illustrated in Figs. 1 and 2; Fig. 5, a detail showing the manner of connecting the lug and ring portions shown in Fig. 4, and Fig. 6 an enlarged sectional elevation in detail of a portion of the apparatus shown in Fig. 2.

In constructing my improved mechanism for treating ores, which comprises one or any number of electrocyanid-pans, I provide for each pan or shell employed a suitable framework comprising uprights 7, transverse beams 8, and longitudinal beams 9, upon which is mounted a suitable circular shell or pan 10, forming a chamber. The upright walls and bottom of this shell are made, preferably, of boiler-iron. A layer of asphalt 11 of the desired thickness covers the entire bottom of the shell, forming an insulation between such bottom portion and a copper plate 12, which rests upon the upper surface of the asphalt layer and is connected with the negative pole of a suitable source of electricity by means of an electric wire 13.

In order to provide suitable means for subjecting the ore when in suspension in the desired mixture to the simultaneous action of air, electricity, and the cyanid solution, in which the ore is maintained in suspension by agitating the mixture, and to confine the air, so as to thoroughly agitate the mixture while within the electric zone or electric current and while the solution is being agitated and the particles of mineral sustained in suspension, I provide disk mechanism comprising circular plates or annular segmental wrought-iron disks 14 and 15, which extend substantially from the inner wall 16 to the outer wall 10 of the pan, so as to form a substantially complete cover over the mixture under treatment coextensive with the copper plate on the bottom of the pan. This disk mechanism is adapted to prevent the air which is forced between it and the copper plate or bottom of the pan from escaping upward and also serves to distribute the electric current uniformly over the entire area included between the iron disks and such copper plate. It also provides a substantially uniform and permanent current of electricity from the wrought-iron disks to the copper plate and through the solution hereinafter described. It will also be seen that the disks and copper plate being insulated and at the desired distance apart formed what may be termed the "walls" of a passage, through which the mixture to be treated is passed and subjected to the simultaneous action of the electric current, air forced therethrough, and the chemical action of the cyanid, salt, and lime, as hereinafter set forth.

In order to produce the necessary agitation of the mixture to be treated while it is being subjected to the action of the electric current, it is necessary to mount the segmental disks rotatably. To accomplish this, an upright vertical shaft 17 is provided, having its lower end resting in an adjustable step-box 17' and its upper end provided with a head 18, upon which are mounted rigid arms 19, which extend to the inner side of the outer disk, and suspending arms 20, which extend to substantially the outer edge of the outer disk, to which they are connected by means of lugs 21, which extend over the extreme curved end 22 of such rod. The rigid arms are attached to the outer segmental disk by means of a wrought-iron ring 23, to which they are bolted or attached in any desired manner.

To support the inner segmental disk rotatably, a quill 24 is mounted so as to encircle the vertical shaft already described, its lower end being provided with a gear-wheel 26, mounted in fixed relation thereto and resting upon a seat 27, attached to the vertical shaft already described and rotatable therewith. The upper end of this quill is provided with a supporting-head 27' similar to the head which is mounted upon the vertical shaft, which in turn is provided with a bearing-sleeve 28, rotatably engaging the vertical shaft and in fixed relation to the head, to which it is attached by means of a bolt 29. This head is provided with rigid arms 30, which are attached to the inner edge of the inner disk, by means of a wrought-iron ring 31, foot 32, and bolts 33, in such manner that the disk is removable without removing the ring when desired, and the ring and disk are removable together, so as to enable the whole to be removed when desired. In order to provide a positive electric current for the segmental disks, a copper ring or collar 34 is mounted upon the vertical shaft in fixed relation thereto, and suitable brushes (not shown) are mounted in sliding engagement with said collar and connected by means of an electric wire 36 to the positive pole of a direct or straight current dynamo or other suitable source of electric supply. A similar copper ring or collar 37 is mounted at the lower end of the quill in fixed relation thereto and is provided with a brush, (not shown,) mounted in sliding engagement therewith and attached to a suitable electric wire 39, which is also electrically connected with the positive pole of the dynamo already mentioned.

To insulate the shaft and quill, and thereby the segmental disks, from the copper plate or cathode and bottom portion of the tank, as well as the inner and outer walls, a suitable rubber insulator 40 is mounted between the bearing-ring 41, which supports the quill and shaft at the point of connection with the pan. In order to permit the easy rotation of the parts, a bearing-sleeve 42 is interposed between the bearing-ring, already described, and the quill, so as to provide a sliding engagement therewith, such sleeve being in fixed relation to the bearing-ring 41, to which it is attached by means of a bolt 43. By this arrangement it will be readily seen that the positive current passes from the copper rings 34 and 37 through the vertical shaft and quill, respectively, and from thence through the supporting-arms to the wrought-iron segmental disks, the negative current passing from the copper plate 12, through the wire 13, to the negative pole of the dynamo. To complete the electric circuit, it is only necessary that a suitable electrolyte be added, electrically connecting the upper iron disks with the lower copper plate. This is accomplished in connection with the treatment of the material, as hereinafter more fully described.

It is desirable that the inner and outer disks be rotated at different rates of speed in accordance with the different degrees of fineness of the particles of ore to be maintained in suspension by means of the rotation of such disks and the paddles attached thereto and rotatable therewith and that the speed of movement of such parts be regulated so as to prevent the particles of ore from settling and at the same time prevent such particles as have been deposited upon the amalgamated plate from being removed by abrasion or erosion. In order to accomplish this, the vertical shaft upon which the outer disk is mounted is provided with a gear 44, mounted in fixed relation thereto and operatively connected with a horizontal shaft 45 by means of a bevel-gear 46, such horizontal shaft being mounted adjustably in journal-boxes 47 and 48, and the quill is provided with the bevel-gear 26, already described, operatively connected with the horizontal shaft 49 by means of a bevel-gear 49', such shaft being adjustably mounted in the frame by means of adjustable bearing-boxes 50 and 51, similar to those in which the shaft 45 is mounted. Each of such shafts is provided with a driving-pulley 52 and 53, respectively, adapted to be attached to a suitable source of power by means of a belt in any desired manner.

To provide suitable means for agitating the mixture containing the pulverized ores in suspension to be treated and to provide for the removal and replacing of the disks in order to enable the clean-up to be accomplished at any desired time without necessity for removing the entire disks, such disks are made in segments 54 54, which are separately removable. Each of these segments is provided with a pair of metallic lugs 21 near its outer edge, each adapted to removably engage the end of one of the suspending-rods 20, already described, there being two of such rods for each segment of both the outer and inner disks. Each segment is also provided at its inner edge with a pair of suitable metallic lugs 56, which rest upon the iron ring 23 for the outer disk and iron ring 31 for the inner disk and are held in place by means of pins 57, which engage perforations 58 in such lugs and prevent any horizontal play of the segments. The segments are each provided upon their under surface with a suitable paddle 59 of non-conducting material, preferably wood, of the desired width to leave the necessary space between the bottom of such paddle and the copper plate upon the bottom of the pan. These paddles are attached to the disks by means of headed bolts 87 and nuts 88, which are insulated from the metallic plate at the bottom of the shell by wooden plugs 89 driven into the perforation in the paddle for receiving the bolt. To permit the pulp, which might otherwise accumulate upon the upper surface of the disks, to pass therethough into the space between the revolving disk and the bottom of the pan, all the segments are provided with long narrow notches 60 upon the adjacent edges thereof, which together form slots or openings between the segments of the disks—in other words, form suitable openings through the disks when the segments are in place for permitting any material which might otherwise settle and accumulate upon such disks to pass therethrough. These slots are made preferably wider at the inner end than at the outer end and are placed upon the following side and closely adjacent to the paddles in order to provide the necessary opening to permit the material which might lodge upon the disk to pass therethrough and at the same time to practically prevent the air from escaping from beneath such disk. It will be readily seen that the downward current of the pulp which passes through the slots closes them to a sufficient extent to prevent the escape of air upward therethough.

In order to provide suitable means for forcing air through the suspended pulp contained in the space between the revolving disks and the bottom of the pan, a suitable pipe 61 is provided, which entirely encircles the pan and is provided with a plurality of branch pipes 62, having openings 63 at the desired intervals, communicating with the inner chamber of the pan between the under surface of the revolving disks and the copper plate on the bottom of the pan. Each of the branch pipes is provided with a suitable valve 64 for controlling the inlet of air therethrough.

To provide suitable means for removing the pulp after treatment, a large outlet-pipe 65 is provided at the bottom of the tank, in which is mounted a suitable valve 66, which may be of any ordinary and well-known type. It is desirable to insulate the driving-shafts, so as to prevent the electricity from leaking by reason of the conductivity of such shafts, and to accomplish this each shaft is provided with a suitable rubber insulator 67, held in place thereon by means of cast-iron shaft-couplings 68.

In order to provide for the adjustment of the rotatable disks with relation to the pan and copper plate, the step-box bearing 17, above referred to, is rigidly mounted upon suitable beams 69 and an adjustable box 17' is mounted therein, resting upon a vertical set-screw 71, horizontal set-screws 72 being mounted in the rigid step-box and engaging the sides of an adjustable or inner box. The lower end of the vertical shaft resting rotatably in the inner box is thus adapted to be adjusted both vertically and horizontally in any desired direction and to any desired extent.

To provide for the adjustment of the rotatable disks with relation to each other, the head 18, which supports the outer disk, is provided with a vertical set-screw 72, which engages the upper end of the shaft and by means of which the head, and thereby the outer disk, may be raised or lowered as desired. By means of this arrangement it will be readily understood that the disks are adjustable with relation to each other and to the bottom of the pan and that the horizontal shafts for driving the disks are also adjustable vertically in order to enable the gear-teeth to properly mesh at all times. The object of adjusting the rotatable disks is not merely to prevent the possibility of friction between the parts, but also for the purpose of regulating the quantity of the electric current passing between the anode and cathode surfaces, or, in other words, between the metallic revolving disks and the copper plate on the bottom of the pan by varying the distance between them when the electrolyte is in use.

I claim—

1. In a machine of the class described, the combination of an outer shell forming a chamber and provided with an inner metallic portion, a second metallic element mounted adjacent to such inner metallic portion insulated therefrom and forming a chamber between such parts for containing a mixture having pulverized ore therein to be operated upon, means for connecting such metallic elements to the negative and positive poles respectively of a source of electric supply, means for agitating the mixture containing pulverized ore to be operated upon, and means for forcing air into the chamber formed by the shell, substantially as described.

2. In a machine of the class described, the combination of an outer shell provided with an amalgamated inner metallic element, a second metallic element mounted adjacent to such inner metallic portion insulated therefrom and forming a chamber between such parts for containing a mixture having pulverized ore to be operated upon, means for connecting such metallic elements to the negative and positive poles respectively of a source of electric supply, means for agitating the mixture containing the pulverized ore to be operated upon, and means for simultaneously forcing air into such mixture, substantially as described.

3. In a machine of the class described, the combination of an outer shell, an amalgamated metallic plate mounted therein and insulated therefrom, a second metallic element mounted adjacent to such metallic plate insulated therefrom and forming a chamber between such parts for containing a mixture having pulverized ore therein to be operated upon, means for connecting such metallic elements to the negative and positive poles respectively of a source of electric supply, means for agitating the mixture containing the pulverized ore to be operated upon, and means for simultaneously forcing air into such mixture, substantially as described.

4. In a machine of the class described, the combination of an outer shell forming a mixture-containing chamber provided with an inner metallic portion, disk mechanism comprising separately-movable disks mounted adjacent to such inner metallic portion insulated therefrom and forming a space between such disks and the inner metallic portion of the shell, means for operating such movable disks independently of each other, means for connecting such disks and the inner metallic portion of the shell to the positive and negative poles respectively of a source of electric supply, means for agitating the mixture containing the pulverized ore to be operated upon, and means for simultaneously forcing air into such mixture-containing chamber, substantially as described.

5. In a machine of the class described, the combination of an outer shell forming a mixture-containing chamber, an insulated amalgamated metallic plate mounted at the bottom of such shell, a second metallic element mounted above such plate insulated therefrom and providing a space between such parts for containing a mixture having pulverized ore to be operated upon, means for connecting such metallic elements to the negative and positive poles respectively of a source of electric supply, means for agitating the mixture containing the pulverized ore to be operated upon, and means for forcing air into such mixture-containing chamber, substantially as described.

6. In a machine of the class described, the combination of an outer shell forming a mixture-containing chamber and provided with a metallic plate at the bottom, a second metallic element mounted above such plate insulated therefrom and providing a chamber between such parts for containing a mixture having pulverized ore therein to be operated upon, means for connecting such metallic elements to the negative and positive poles, respectively, of a source of electric supply, a plurality of paddles mounted intermediate such metallic elements for agitating the mixture containing the ore to be operated upon, and means for forcing air into such mixture-containing chamber while the mixture is being agitated, substantially as described.

7. In a machine of the class described, the combination of an outer shell forming a mixture-containing chamber and provided with a metallic plate forming the inner bottom portion thereof, metallic disk mechanism insulated from such metallic bottom portion and extending over it to form a space between such parts for containing the material to be operated upon, means for connecting such metallic elements to the negative and positive poles respectively of a source of electric supply, a plurality of paddles mounted upon the under side of such disk mechanism and rotatable therewith for agitating the mixture to be operated upon, and means for forcing air into the space between such metallic elements, substantially as described.

8. In a machine of the class described, the combination of an outer shell forming a chamber, metallic plate mounted at the bottom of such chamber, metallic disk mechanism rotatably mounted above such plate at a distance therefrom and provided with means for connecting such disk mechanism with one of the poles of a source of electric supply, means for connecting the metallic plate with the opposite pole of the source of electric supply, air-pipe mechanism communicating with the space between such metallic disk mechanism and bottom plate for forcing air into such space and means for rotating such disk mechanism, substantially as described, 9. In a machine of the class described, the combination of an outer shell forming a mixture-containing chamber, a metallic plate mounted at the bottom of such shell, metallic disk mechanism movably mounted above and covering such plate comprising separately-movable annular disks each formed of separately-removable segments insulated from and providing a space between such disk mechanism and the plate, means for connecting such disk mechanism with the positive pole of a source of electric supply, means for connecting such metallic plate with the negative pole of a source of electric supply, means for moving such annular disks independently of each other, and means for forcing air into such mixture-containing chamber, substantially as described.

10. In a machine of the class described, the combination of an outer shell forming a chamber, a metallic plate mounted at the bottom of such shell, a layer of asphalt mounted intermediate the plate and the outer portion of the shell for insulating such parts, metallic disk mechanism rotatably mounted above such plate and having a superficial area substantially equal to that of the plate arranged at a distance therefrom and provided with means for connecting such disk mechanism with one of the poles of a source of electric supply, means for connecting the metallic plate with the opposite pole of the source of electric supply, means for agitating the mixture to be operated upon, means for admitting air under pressure to the chamber, and means for rotating such disk mechanism, substantially as described.

11. In a machine of the class described, the combination of an outer shell forming a chamber, a metallic plate mounted at the bottom of such shell, metallic disk mechanism rotatably mounted above such plate and having a superficial area substantially equal to that of the plate arranged at a distance therefrom and provided with means for connecting such disk mechanism with one of the poles of a source of electric supply, means for connecting the metallic plate with the opposite pole of the source of electric supply, means for rotating such disk mechanism, a plurality of paddles made of non-conducting material mounted upon the under side of the disk mechanism, and pipe mechanism provided with air-passages communicating with the space between such disk mechanism and plate, substantially as described.

12. In a machine of the class described, the combination of a shell provided with a chamber having a metallic inner portion, a metallic disk formed of separate segments rotatably mounted adjacent to such inner metallic portion at a distance therefrom, means for insulating such metallic elements, means for connecting such metallic disk and the metallic portion of the shell with the opposite poles respectively of a source of electric supply, means for agitating the mixture to be operated upon, and means for forcing air under pressure into the space between the disk mechanism and the inner metallic portion of the shell simultaneously with the passage of the electric current through the mixture to be operated upon and the agitation thereof, substantially as described.

13. In a machine of the class described, the combination of a shell provided with a chamber having an inner metallic portion, metallic disk mechanism rotatably mounted therein and insulated therefrom, means for connecting such disk mechanism and the inner metallic portion of the shell with the opposite poles respectively of a source of electric supply, means for admitting air under pressure to the chamber of the shell, and means for adjusting such disk mechanism, substantially as described.

14. In a machine of the class described, the combination of a shell provided with a chamber, a metallic plate mounted at the bottom of such shell, a layer of asphalt mounted intermediate such plate and the bottom of the shell for insulating such parts, disk mechanism rotatably mounted above such metallic plate and provided with a metallic under surface of substantially equal superficial area to the exposed surface of the metallic plate, means for rotating such disk mechanism, air-pipe mechanism provided with a plurality of air-passages communicating with the space between such disk mechanism and the metallic plate, and means for electrically connecting such metallic plate and disk mechanism with the opposite poles respectively of a source of electric supply, substantially as described.

15. In a machine of the class described, the combination of a shell provided with a chamber, a metallic plate mounted at the bottom of such shell and insulated therefrom, means for connecting such plate with the negative pole of a source of electric supply, disk mechanism comprising a plurality of independently-movable disks mounted above such plate provided with a metallic under surface of substantially equal superficial area to the exposed surface of the metallic plate, means for connecting such disks with the positive pole of a source of electric supply, means for rotating such disks independently of each other, means for adjusting such disks with relation to each other, means for adjusting the disks with relation to the metallic plate, mechanism for agitating the mixture to be operated upon, and air-pipe mechanism provided with air-passages communicating with the space between such disks and the metallic plate, substantially as described.

JOHN R. PARKS.

Witnesses:
HARRY IRWIN CROMER,
MAUDE DARNELL.